United States Patent Office 3,080,379
Patented Mar. 5, 1963

3,080,379
2-SUBSTITUTED TESTOLOLACTONES
Fred A. Kincl and Howard J. Ringold, Mexico City, Mexico, assignors, by mesne assignments, to Syntex Corporation, a corporation of Panama
No Drawing. Filed Feb. 24, 1960, Ser. No. 10,554
Claims priority, application Mexico Feb. 24, 1959
14 Claims. (Cl. 260—343.2)

The present invention relates to a new process for the production of certain phenanthrene derivatives and to certain new compounds prepared by the new process.

This application is a continuation-in-part of our co-pending patent application Serial No. 849,451, filed October 29, 1959.

Among others, there are produced by the process according to the invention compounds of the general formulas:

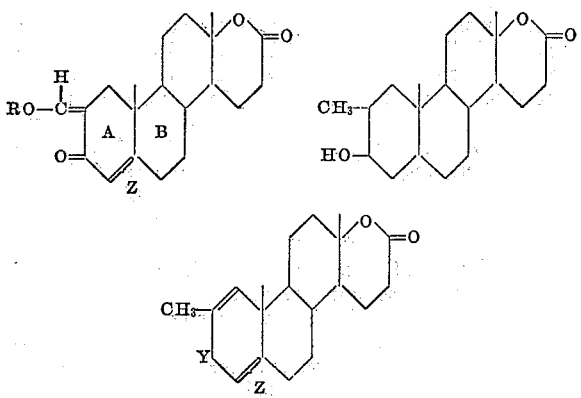

which are described and claimed also in our co-pending patent application Serial No. 849,451 as well as 2α-methyl-dihydro-allo-testololactone, also described in the aforesaid co-pending application, and other new compounds of a common general formula comprising the last mentioned 2α-methyl derivative, namely:

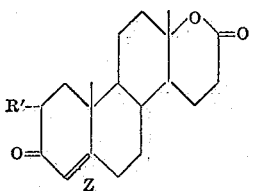

In the above formulas, R is selected from the group consisting of hydrogen, the acyl radical of a hydrocarbon carboxylic acid having up to 12 carbon atoms, and the radical of a hydrocarbon having up to about 8 carbon atoms; $R^1$ is a lower hydrocarbon radical having up to 8 carbon atoms; Y is selected from the group consisting of

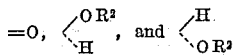

wherein $R^2$ is selected from the group consisting of hydrogen and the acyl radical of a hydrocarbon carboxylic acid having up to 12 carbon atoms; and Z is the linkage between C-4 and C-5 selected from the group consisting of a single bond with the hydrogen atom at C-5 in α-position, and a double bond. Rings A and B of the phenanthrene nucleus as designated in the first above-shown formula, are thus in trans-position when the $C^4$-to-$C^5$ bond is saturated.

More specifically, among the compounds corresponding to the above formulas which can be produced by the process according to the invention, there are 2-hydroxymethylene-testololactone, 2-hydroxymethylene-4,5-dihydro-allo-testololactone, 2α-methyl-4,5-dihydro-allo-testololactone, 2-methyl-1-dehydro-testololactone, 2-methyl-1-dehydro-4,5-dihydro-allo-testololactone, 2α-methyl-androlactone and 2α-methyl-epi-androlactone; the compounds produced by the process according to this invention further comprise the esters of the aforementioned compounds formed with hydrocarbon carboxylic acids of up to about 12 carbon atoms, which acids are saturated or unsaturated, of straight, branched, cyclic or mixed cyclic-aliphatic chain, optionally substituted with functional groups (hydroxyl, acyloxy (of up to 12 carbon atoms), alkoxy (of up to 5 carbon atoms), halogen (fluorine, chlorine or bromine) or other groups); typical new esters are, among others, the acetates, propionates, butyrates, hemisuccinates, enanthates, caproates, benzoates, trimethylacetates, phenoxyacetates, cyclopentylpropionates, phenylpropionates and β-chloropropionates. The hydrocarbonoxymethylene group at C–2 may be formed with an aliphatic alcohol of up to 5 carbon atoms, with an aromatic alcohol or with a mixed aliphatic-aromatic alcohol. Typical alkoxy groups are the methoxy, ethoxy, and propoxy groups, and a typical ariloxy group is the benzoxy group.

$R^1$ can be, in particular, methyl, ethyl, propyl or benzyl.

These compounds, and in particular 2α-methyl-dihydro-allo-testololactone as well as the new 2α-methyl-testololactone exhibit valuable therapeutic properties: inhibit the gonadotrophin and show anti-estogenic activity.

The new process according to the invention is distinguished from the process described in our co-pending patent application Serial No. 849,451 by superior yields, in particular of 2α-methyl-4,5-dihydro-allo-testololactone.

In our earlier process we used as starting materials testololactone or 4,5-dihydro-allo-testololactone, which was converted, for instance, to the corresponding lactonic acid, and further directly to the 2-hydroxymethylene derivative of testololactone or 4,5-dihydro-allo-testololactone by treatment of the lactonic acid with ethyl formate and sodium methoxide in benzene. Either 2-hydroxymethylene derivative was then catalytically hydrogenated using, for instance, palladium on carbon as the catalyst, to afford 2α-methyl-4,5-dihydro-allo-testololactone.

The new process according to the present invention involves production of the 2-hydroxymethylene intermediate by essentially the steps described above. However, according to an important feature of our new process, the latter intermediate is then subjected to treatment with a hydrocarbon halide in solution in an inert organic solvent in the presence of an alkali metal hydride, preferably at reflux temperature, whereby the respective 2-methyl-2-aldehydo derivative is obtained.

The aforesaid hydrocarbon halide is selected from the group consisting of lower alkyl halides and aralkyl halides. The preferred hydrocarbon halide is methyl iodide. The preferred inert solvent is benzene. The preferred base in this process step is sodium hydride.

According to another feature of the process of the present invention, the transformation of the 2-methyl-2-aldehydo grouping of the aforesaid derivative to the 2α-methyl group may be carried out either by alkaline treatment, for example with alkaline alumina, or by acid treatment, with a mineral acid.

The process according to the present invention can be illustrated by the following reaction diagram:

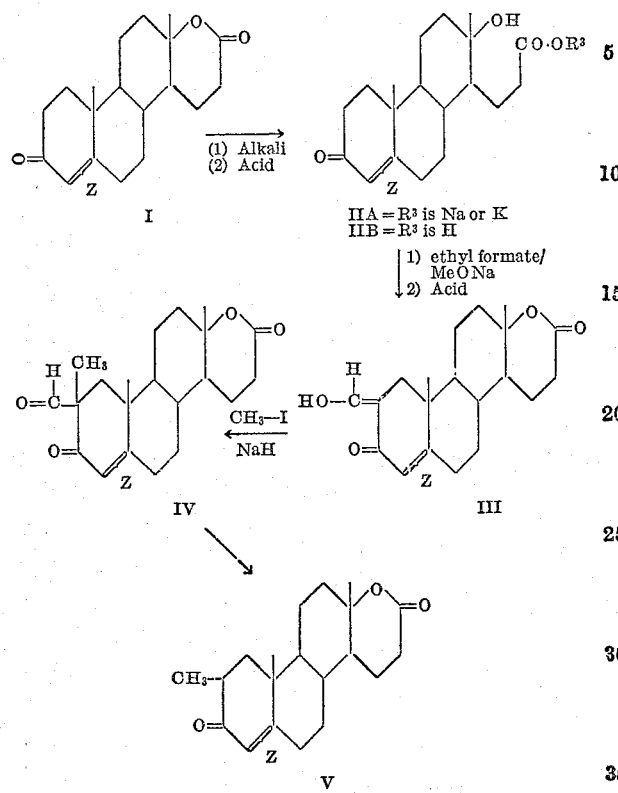

In the above reaction diagram, Z has the meaning described hereinbefore and $R^3$ is selected from the group consisting of hydrogen and the alkali metals, preferably sodium or potassium.

The above illustrated new process thus comprises the conversion of the starting material I to the corresponding testololactonic or 4,5-dihydro-allo-testololactonic acid (IIB) by first reacting the starting material with an alkali metal hydroxide under nitrogen, and then acidifying the intermediate (IIA) with a dilute mineral acid such as hydrochloric acid.

According to one mode of carrying out this phase of the process of the invention, the lactonic acid compounds (IIB) were then stirred in solution in an inert organic solvent such as benzene and under an atmosphere of nitrogen with ethyl formate and an alkali metal alcoholate such as sodium methoxide and the resulting crude reaction product was subjected to an acid treatment, preferably with dilute hydrochloric acid; thus were produced respectively 2-hydroxymethylene-testololactone (III, Z being a double bond), or 2-hydroxymethylene-4,5-dihydro-allo-testololactone (III, Z being a single bond and rings A and B in trans-position to each other). The compounds of Formula III were then refluxed with a methyl halide preferably with methyl iodide, in benzene solution and in the presence of catalytic amounts of sodium hydride, and the reaction mixture was cautiously acidified, preferably by the addition of dilute hydrochloric acid. Thus there were obtained 2-methyl-2-aldehydo-testololactone (IV, Z being a double bond) or 2-methyl-2-aldehydo-4,5-dihydro-allotestololacetone (IV, Z being a single bond), respectively.

Preferably by reaction of the last mentioned compounds IV in acetone solution with dilute hydrochloric acid, there were obtained respectively, as final compounds, 2α-methyl-testololactone (V, Z being a double bond), and 2α-methyl-4-5-dihydro-allo-testololactone (V, Z being a single bond).

According to another mode of carrying out the process of the invention, the acids of testololactone or of 4,5-dihydro-testololactone were condensed with a dialkyl ester of oxalic acid, preferably diethyl oxalate, in benzene solution and in the presence of sodium hydride, and the intermediate compounds obtained were directly treated with aqueous dilute hydrochloric acid to produce the 2-ethoxyoxalates of testololactone or of 4,5-dihydro-allo-testololactone (VI), which were converted to the 2-methyl-2-ethoxyoxalates (VII) by refluxing with methyl iodide and potassium carbonate in benzene and under anhydrous conditions. By subsequent reaction with sodium methoxide in methanol and then with aqueous dilute hydrochloric acid, there were produced the desired 2α-methyl-derivatives of testololactone or of 4,5-dihydro-allo-testololactone, respectively.

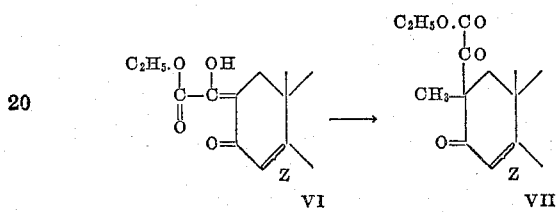

In the above described reaction for converting compounds (III) to compounds (IV), methyl iodide was substituted by another lower alkyl iodide such as ethyl iodide or propyl iodide, or by benzyl iodide, and there were obtained the compounds (IV) with the corresponding 2-aldehydo-2-lower-alkyl or 2-aldehydo-2-benzyl grouping, and finally the corresponding 2α-alkyl and 2α-benzyl-testololactone or 2α-alkyl and 2α-benzyl-4,5-dihydro-allo-testololactone, respectively for example the 2α-ethyl-, 2α-propyl and 2α-benzyl derivatives of such testololactones.

Example 1

A mixture of 2.8 g. of testololactonic acid, 200 cc. of benzene, 3 g. of sodium methoxide, and 10 cc. ethyl formate is stirred for five hours under an atmosphere of nitrogen and at room temperature. The resulting precipitate is filtered off, washed consecutively with benzene and hexane, and dried under reduced pressure. The resulting product in powder form is added to a mixture of 200 cc. of water and 50 cc. of concentrated hydrochloric acid, which is then stirred at room temperature for 72 hours. The resulting solid phase is separated by filtration, washed with water, dried and re-crystallized from acetone-hexane, whereby there is obtained 2-hydroxymethylene-testololactone.

A suspension of 2.2 g. of the above compound and 170 mg. of sodium hydride in 50 cc. of dry benzene was treated with 10 cc. of methyl iodide and the mixture was refluxed under an atmosphere of nitrogen for 24 hours; there was then added an additional 10 cc. of methyl iodide and the mixture was refluxed for 48 hours; again 10 cc. of methyl iodide was added and the mixture was refluxed for 72 hours. The liquid was then removed by vacuum distillation and the residue containing 2-methyl-2-aldehydo-testololactone was used for the subsequent stage without further purification. A small amount was chromatographed on silica gel to isolate the compound in pure form.

A solution of the above residue in 100 cc. of acetone was acidified with 5 cc. of 6 N hydrochloric acid and the mixture was kept at room temperature for 24 hours. The reaction product was extracted with ether, washed several times with water, dried over anhydrous sodium sulfate, the ether was evaporated and the residue was purified by chromatography on silica gel. There was thus obtained the desired 2α-methyl-testololactone.

The starting material for this example was prepared in the following manner:

One gram of testololactone is refluxed for three hours in mixture with 100 cc. of an aqueous solution of sodium hydroxide having a concentration of 2 g. of NaOH per liter, under an atmosphere of nitrogen. After cooling to 0° C., the mixture is acidified with diluted hydrochloric acid, the resulting precipitate is separated by filtration, washed with water and then dried under reduced pressure, whereby testololactonic acid is obtained.

Example 2

In accordance with the method described in the preceding example, 4,5-dihydro-allo-testololactonic acid was converted by reaction with ethyl formate followed by acidification into 2-hydroxymethylene-4,5-dihydro-allo-testololactone, M.P. 169–173° C.; $[\alpha]_D+8°$; $\lambda_{max}$. 282 m$\mu$ (log $\epsilon$ 4.00); by treatment with methyl iodide the latter was converted into 2-methyl-2-aldehydo-4,5-dihydro-allo-testololactone, which was in turn transformed into 2$\alpha$-methyl-4,5-dihydro-allo-testololactone, M.P. 164–167° C.; $[\alpha]_D-19°$, by cleaving the 2-methyl-2-aldehydo grouping by the reaction with dilute hydrochloric acid.

The starting material for this example was prepared according to the same method used for the preparation of the starting material in the preceding example, by applying the same to 4,5-dihydro-allo-testololactone which thus was converted to 4,5-dihydro-allo-testololactonic acid, M.P. 195–200° C.; $[\alpha]_D+4°$ (chloroform).

Example 3

A mixture of 3 g. of testololactonic acid, prepared as described in Example 1, 5 cc. of diethyl oxalate, 1 g. of sodium hydride and 150 cc. of benzene was stirred for 5 hours at room temperature and the solid formed was collected by filtration, washed with benzene and hexane and dried under vacuum; the powder thus obtained was added to 200 cc. of water containing 50 cc. of concentrated hydrochloric acid and the mixture was stirred at room temperature for 72 hours; the solid was collected, washed with water, dried and recrystallized from acetone-hexane, thus yielding the 2-ethoxyoxalate of testololactone.

A mixture of 2 g. of the above compound, 5 g. of powdered anhydrous potassium carbonate, 5 cc. of methyl iodide and 100 cc. of acetone was refluxed under an atmosphere of nitrogen for 72 hours. The insoluble material was removed by filtration and the filtrate was concentrated to a small volume under reduced pressure. The reaction product (2-methyl-2-ethoxyoxalate of testololactone) was precipitated by the addition of water, collected by filtration, washed with water and dried. The latter was then treated with 50 cc. of methanol containing 2 g. of sodium methoxide, stirred at room temperature for 24 hours and the solvent was evaporated under reduced pressure; the residue was suspended in 100 cc. of water containing 10 cc. of concentrated hydrochloric acid, stirred for 72 hours at room temperature and the solid was collected by filtration, washed with water, dried and recrystallized from acetone-hexane, thus furnishing 2$\alpha$-methyl-testololactone, identical with the one obtained in accordance with the method of Example 1.

Example 4

In accordance with the method of the preceding example, 4,5-dihydro-allo-testololactonic acid was converted by the reaction with diethyl oxalate and subsequent acid treatment into the 2-ethoxyoxalate of 4,5-dihydro-allo-testololactone, which was treated with methyl iodide, then with sodium methoxide and finally with hydrochloric acid, to produce 2$\alpha$-methyl-4,5-dihydro-allo-testololactone, identical with the one obtained in accordance with the method of Example 2.

Example 5

Example 1 was repeated, however in the treatment of the intermediate 2-hydroxymethylene-testololactone, ethyl iodide was substituted for methyl iodide and there was ultimately obtained 2$\alpha$-ethyl-testololactone.

Example 6

Example 2 was repeated, however in the treatment of the intermediate 2-hydroxymethylene-4,5-dihydro-allo-testololactone, methyl iodide was replaced by propyl iodide, and there was obtained ultimately 2$\alpha$-propyl-4,5-dihydro-allo-testololactone.

Example 7

Example 1 was repeated, however benzyl iodide was applied instead of methyl iodide in the treatment of 2-hydroxymethylene-testololactone, and there was finally obtained 2$\alpha$-benzyl-testololactone.

Example 8

Example 2 was repeated, but with the same change of reactant as described in the preceding example, so that there was obtained 2$\alpha$-benzyl-dihydro-allo-testololactone.

We claim:
1. A process for producing a compound of the following formula:

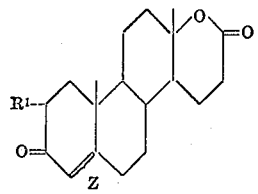

in which Z is selected from the group consisting of a double bond and a saturated linkage, and $R^1$ is selected from the group consisting of lower alkyl and aralkyl of up to 8 carbon atoms, comprising reacting a 2$\alpha$-hydroxymethylene derivative of the formula:

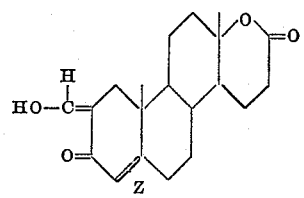

wherein Z has the above defined meaning with a hydrocarbon halide selected from the group consisting of lower alkyl monohalides and aralkyl monohalides having up to 8 carbon atoms in an inert organic solvent and in the presence of an alkali metal hydride and acidifying the reaction mixture to obtain the aforesaid steroidal lactone.

2. A process as described in claim 1, characterized in that the hydrocarbon halide is methyl iodide, the solvent is benzene, the alkali metal hydride is sodium hydride, and the reaction is carried out at reflux temperature.

3. A process as described in claim 2, wherein the starting material is a 2$\alpha$-hydroxymethylene-testololactone and the end product is 2$\alpha$-methyl-testololactone.

4. A process for producing a steroidal lactone of the formula:

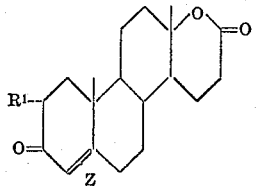

in which Z is selected from the group consisting of a double bond and a saturated linkage, and $R^1$ is selected from the group consisting of lower alkyl and aralkyl of up to 8 carbon atoms, comprising reacting a starting material selected from the group consisting of testololactonic acid and 4,5-dihydro-allo-testololactonic acid with ethyl formate and an alkali metal methoxide in an inert organic solvent, reacting the resulting 2-hydroxy-methylene derivative with a hydrocarbon halide selected from the group consisting of lower alkyl monohalides and aralkyl monohalides having up to 8 carbon atoms in an inert organic solvent and in the presence of catalytic amounts of an alkali metal hydride and acidifying the reaction mixture to obtain the aforesaid steroidal lactone.

5. A compound of the formula:

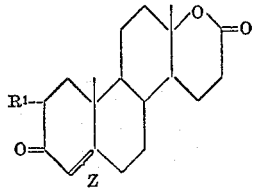

in which Z is selected from the group consisting of a double bond and a saturated linkage and $R^1$ is selected from the group consisting of lower alkyl and aralkyl of up to 8 carbon atoms.

6. 2α-methyl-testololactone.
7. 2α-benzyl-testololactone.
8. 2α-benzyl-4,5-dihydro-allo-testololactone.
9. 2-methyl-2-aldehydo-testololactone.
10. 2 - methyl - 2-aldehydo-4,5-dihydro-allo-testololactone.
11. The 2-ethoxyoxalate of testololactone.
12. The 2-ethoxyoxalate of 4,5-dihydro-allo-testololactone.
13. The 2-methyl-2-ethoxyoxalate of testololactone.
14. The 2-methyl-2-ethoxyoxalate of 4,5-dihydrotestololactone.

References Cited in the file of this patent

UNITED STATES PATENTS 2,806,038    Picha _____ Sept. 10, 1957

OTHER REFERENCES

Wagner et al.: Synthetic Orangic Chemistry, Wiley, New York (1953), page 533.

Hogg et al.: Jour. Amer. Chem. Soc., vol. 77 (1955), pages 6401–6402.

Ringold et al.: Jour. Amer. Chem. Soc., vol. 81 (Jan. 20, 1959), pages 427–429.